United States Patent [19]
Gordon et al.

[11] Patent Number: 5,790,643
[45] Date of Patent: Aug. 4, 1998

[54] PRICING METHOD FOR TELECOMMUNICATION SYSTEM

[75] Inventors: Dale Robert Gordon; James St. John Crookes, both of Belfast; Shaun Alexander Smyton, Suffolk, all of United Kingdom

[73] Assignee: British Telecommunications public limited company, London, England

[21] Appl. No.: 553,419
[22] PCT Filed: Feb. 28, 1995
[86] PCT No.: PCT/GB95/00422
§ 371 Date: Jan. 29, 1996
§ 102(e) Date: Jan. 29, 1996
[87] PCT Pub. No.: WO95/24093
PCT Pub. Date: Sep. 8, 1995

Related U.S. Application Data

[63] Continuation-in-part of Ser. No. 279,641, Jul. 25, 1994.

[30] Foreign Application Priority Data

Mar. 2, 1994 [EP] European Pat. Off. ............ 94301476

[51] Int. Cl.⁶ .................................................. H04M 15/00
[52] U.S. Cl. ........................ 379/119; 379/126; 379/112
[58] Field of Search .......................... 379/90–91, 93, 379/111, 112, 114, 115, 116, 118, 119, 120, 122, 126, 123, 127

[56] References Cited

U.S. PATENT DOCUMENTS

4,979,207 12/1990 Baum et al. .
5,008,929 4/1991 Olsen et al. .
5,103,475 4/1992 Shuen .
5,185,785 2/1993 Funk .
5,351,286 9/1994 Nici .
5,559,871 9/1996 Smith ................................. 379/115

OTHER PUBLICATIONS

Benyacar et al, "Concepts in Recording of Services", TENCON '89, Nov. 1989, Bombay, India, pp. 593–599, XP2203943.

Smyton et al, "National Charging Database", British Telecommunications Engineering, vol. 10, No. 3, Oct. 1992, London, GB, pp. 250–253.

*Primary Examiner*—Paul Loomis
*Attorney, Agent, or Firm*—Nixon & Vanderhye P.C.

[57] ABSTRACT

A telephone charging system prices calls made by customers in a telecommunications network. The system includes a local exchange which provides a call record for each call, a database containing details of the customers of the network, a database which contains the locations of the individual numbers, details of routes between the numbers and a set of tariffs for pricing calls, a processor which receives call records from the local exchange and data from the databases and uses the call records and data to price calls, and a store for storing details of the priced calls. In order to price a typical call, the processor evaluates a factor relating to the type of service used in the call, a factor relating to the type of customer, a factor relating to the locations of the calling and called number in the network and a factor relating to the day on which the call is made. The values of the factors are used to select the tariff from the set of call tariff stored in database and the call is then priced in accordance with this tariff.

18 Claims, 5 Drawing Sheets

PRICING METHOD FOR TELECOMMUNICATION SYSTEM

CROSS-REFERENCE TO RELATED APPLICATION

This application is a continuation-in-part of our copending commonly assigned application Ser. No. 08/279,641 filed Jul. 25, 1994.

FIELD OF THE INVENTION

This invention relates to a method of pricing a call originating in a telecommunications network and also to a system for pricing a telecommunications call originating in a telecommunications network.

BACKGROUND OF THE INVENTION

In a known method of pricing calls in a public telephone network, each call is initially priced in arbitrary units at the local exchange of the calling number. The main parameters used in the initial pricing are the distance between the calling and called numbers, the duration of the call and the charging period in which the call occurs. The price of the call in arbitrary units is then transferred, usually in a batch, to a computer located at a remote position which has a database containing details of the customers of the telephone network. This computer then translates the price in arbitrary units to a price in local currency using the tariff applicable to the customer.

This known method of pricing a telephone call is generally inflexible. For example, if it is desired to change the tariff for calls in a particular charge period for the whole telephone network, the data must be changed at each local exchange.

SUMMARY OF THE INVENTION

According to a first aspect of this invention, there is provided a method of pricing a call originating in a telecommunications network comprising the steps of:

retrieving a record of the call from a point located in the telecommunications network; providing a first database containing details of customers of the network; providing a second database containing details of the network and a set of call tariffs; and processing data from the call record, the first database and the second database to price the call.

Because calls are priced using data from call records and from the first and second databases, the present invention makes it possible to price calls in a flexible manner. For example, in order to provide a new tariff, it is only necessary to provide the data for the new tariff in the second database and details of a new tariff are not required at points where records of calls originate.

According to a second aspect of this invention, there is provided a method of pricing a call originating in a telecommunications network comprising the steps of: retrieving a record of a call from a point located in the telecommunications network; finding a factor (the service factor) relating to the type of service used in the call by processing data contained in the call record; finding a factor (the customer factor) relating to the type of customer making the call; finding a factor (the network factor) relating to the locations of the calling number and the called number; finding a factor (the calendar factor) relating to the day of the call; selecting a call tariff from a set of call tariffs stored in a database in accordance with a combination of the service factor, the customer factor, the network factor and the calendar factor; and pricing the call in accordance with the selected call tariff.

According to a third aspect of this invention, there is provided a method of pricing a call originating in a telecommunications network, the price of the call having at least one component, said method comprising the steps of:

retrieving a record of a call from a point located in the telecommunications network; finding a factor (the first service factor) relating to the type of service used in the call by processing data contained in the call record; using the first service factor to select an algorithm from a set of algorithms which defines which factors from a group of factors are to be used in determining the or each component of the price of the call and the manner of combining the components to determine the price of the call, said group of factors comprising a factor (the second service factor) relating to the type of service used in the call, a factor (the customer factor) relating to the type of customer making the call, a factor (the network factor) relating to the locations of the calling and called numbers, and a factor (the calendar factor) which relates to the day of the call; for the or each component of the price finding the factors defined in the algorithm; for the or each component of the price, selecting a call tariff from a set of call tariffs stored in a database in accordance with the factors defined in the algorithm; for the or each component of the price, determining the component in accordance with the selected algorithm; and where the price of the call has more than one component, combining the components in the manner defined in the algorithm.

According to a fourth aspect of this invention, there is provided a system for pricing a telecommunications call originating in a telecommunications network, said system comprising: a telecommunications point located in the network for providing a call record for each call; a first database containing details of the customers of the network; a second database containing details of the network and a set of call tariffs; means for processing data from a call record, the first database and the second database to price a call; and means for providing a communication link between the processing means and each of the telecommunications switch, the first database and the second database.

According to a fifth aspect of this invention, there is provided a system for pricing a telecommunications call originating in a telecommunications network, said system comprising:

- a telecommunications point located in the network for providing a call record for each call;
- means for finding a factor (the service factor) relating to the type of service used in a call by processing data contained in the call record for the call;
- means for finding a factor (the customer factor) relating to the type of customer making a call;
- means for finding a factor (the network factor) relating to the locations of the calling number and the called number for a call;
- means for finding a factor (the calendar factor) relating to the day of a call;
- means for selecting a call tariff from a set of call tariffs in accordance with the combination of the service factor, the customer factor, the network factor and the calendar factor found for a call; and
- means for pricing a call in accordance with a selected call tariff.

According to a sixth aspect of this invention, there is provided a system for pricing a telecommunications call originating in a telecommunications network, said system comprising:

a telecommunications point located in the network for providing a call record for each call;

means for finding a factor (the first service factor) relating to the type of service used in a call;

means for using the first service factor to select an algorithm from a set of algorithms which defines which factors from a group of factor are to be used in determining the or each component of a price of a call and the manner of combining the components to determine the price of the call, said group of factors comprising a factor (the second service factor) relating to the type of service used in the call, a factor (the customer factor) relating to the type of customer making a call, a factor (the network factor) relating to the locations of the calling number and the called number for a call, and a factor (the calendar factor) relating to the day of a call;

means for finding the factors defined in the algorithm for the or each component of the price of a call;

means for selecting a call tariff for the or each component of the price of a call from a set of call tariffs in accordance with the factors defined in the algorithm;

means for determining the or each component of the price of a call in accordance with the selected call tariff; and means for combining the components in the manner defined in the algorithm.

BRIEF DESCRIPTION OF THE DRAWINGS

This invention will now be described in more detail, by way of example, with reference to the drawings in which.

each of FIGS. 3 to 5 is a flow chart of an algorithm which may used in the system of FIG. 1 for pricing a call.

DETAILED DESCRIPTION OF THE DRAWINGS

An example of this invention will now be described with reference to a public telecommunications network which is capable of providing two types of main service, namely, a service for PSTN (Public Switched Telephony Network) calls and a service for ISDN (Integrated Services Digital Network) calls. It is to be understood that the present invention is suitable for both public and private networks and is suitable for pricing calls using various main services.

Figure 1:
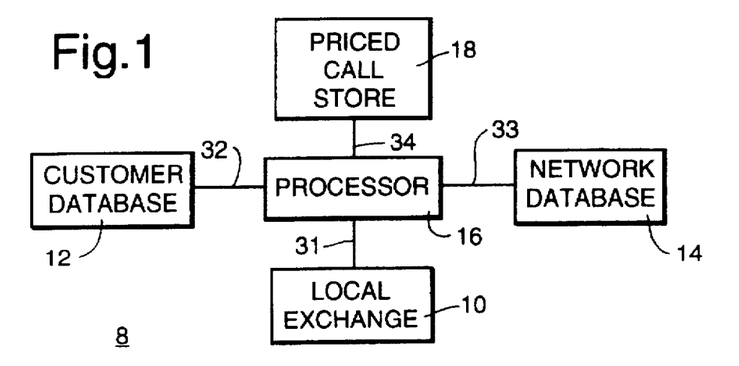
FIG. 1 is a block diagram of a system for pricing calls originating in a telecommunications network embodying this invention.

Referring now to FIG. 1, there is shown a system 8 for pricing calls originating in a public telecommunications network. The system includes a point in the network in the form of a local exchange or switch 10, a database 12 which contains details of the customers of the network, a database 14 which contains both details of the network and a set of call tariffs, a processor 16 which processes data from the local exchange 10, the customer database 12 and the network database 14 to price calls, and a store 18 for storing details of the priced calls. The processor 16 is implemented as a general purpose computer illustrated in FIG. 12. The databases 12, 14 and store 18 are computer data stores.

Figure 12:
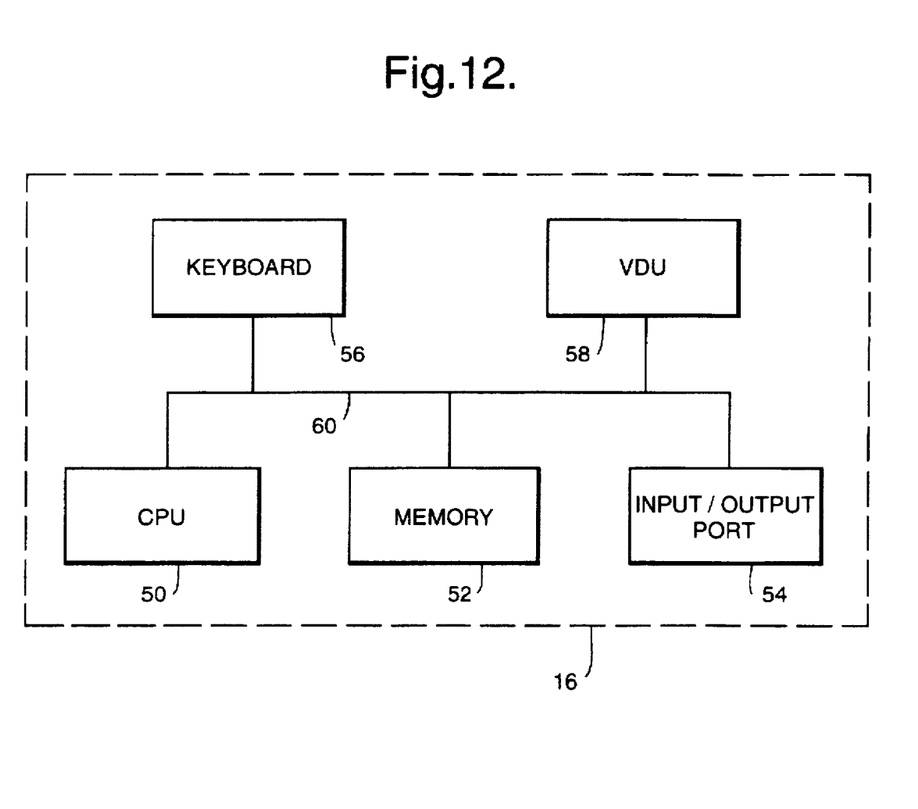
FIG. 12 is a block diagram of a computer which implements the process shown in FIG. 10.

Referring now to FIG. 12, the computer which implements the processor 16 comprises a central processing unit (CPU)50, a memory 52, an input/output port 54, a keyboard 56 and a visual display unit (VDU)58 connected to a data bus 60. The memory 52 is formed from random-access memory (RAM), read-only memory (ROM) and hard and floppy discs. The input/output port 54 is connected to external communication links. The memory 52 contains the program for controlling the computer.

In a public telecommunications network, there are typically a large number of local exchanges and so the local exchange 10 merely represents one of many local exchanges in the network. By way of example, local exchange 10 may be a System X exchange manufactured by GEC Plessey Telecommunications. Although not shown, the local exchanges are connected to a network of trunk exchanges. For each call, the local exchange 10 produces a call record and the fields relevant to pricing a call are shown in FIG. 2.

Figure 2:
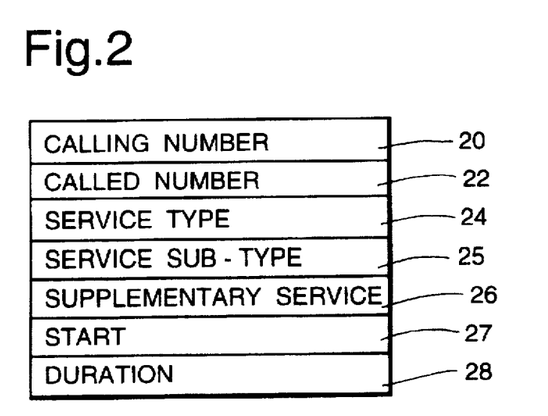
FIG. 2 is a diagram showing the fields of a call record.

Referring now to FIG. 2, the fields relevant to pricing calls include a field 20 for the calling number, a field 22 for the called number, a field 24 for the main type of service used in the call, a field 25 for the sub-type of service used in the call, a field 26 for any supplementary service used in the call, a field 27 for the start time of the call and a field 28 for the duration of the call. In more detail, field 24 gives the main service used in the call which in the present example is either PSTN or ISDN. Field 25 give the sub-type of service used in the call. In the present example, there are three sub-types of service and these are basic call, basic call with call-related supplementary service and non-call related supplementary service. Field 26 gives details of any supplementary service. An example of a call-related supplementary service is charge advice in which a caller is advised of the price of a call immediately after making it. An example of a non-call related supplementary service is setting-up call barring. When applying the present invention to a private network, the call records could be produced at a switch or other suitable network point.

The customer database 12 contains various details of each customer. For each customer, these details include the customer's telephone number, the type of customer (residential, business (PSTN) or business (ISDN)) and the numbers of any options subscribed to by the customer. Examples of such options will be described below. Typically, a public telecommunications network is divided into areas and each area has its own database of customers details. Thus, the customer database 12 represents only one of several such databases. By way of modification, customer type data may be kept at exchanges and supplied as part of the call record.

The network database 14 contains details of the network which are relevant to pricing calls and also a set of call tariffs. The details which are relevant to pricing calls include the geographical location of each telephone number and the types of routes which connect the telephone numbers. As will be described below, both the distance between calling and called numbers and the type of route connecting the numbers are used in pricing system 8. The network database 14 represents a single database for the entire network.

Although FIG. 1 shows only a single store 18 for storing the details of priced calls, it is convenient to provide one such store for each customer database. Normally, the customer databases and stores for priced calls are located together.

In a small network, a single processor, such as a processor 16, can serve all the customer databases and local exchanges. However, in a larger network, there may be several processors such as processor 16 each of which services a sub-set of the customer databases and local exchanges.

The local exchange 10, customer database 12, network database 14 and store 18 are connected to the processor 16 by telecommunications links 31 to 34 and these links may be either permanent links or established as required. As may be appreciated, the local exchange 10, customer database 12, network database 14 and processor 16 are located remotely from each other. Call records are transmitted from the local exchange 10 to the processor 16 either one at a time immediately after each call or in batches. Likewise, details of priced calls are transmitted from the processor 16 to the store 18 either one at a time immediately after each call is priced or in batches. The processor 16 retrieves data from the databases 12, 14 as required. Where call records are transmitted one at a time to the processor 16 and the details of priced calls are then transmitted one at a time to the store 18, the price of each call is available immediately after it has been made.

The processor 16 is provided with a program for processing the data from the local exchange 10, customer database 12 and network database 14 to price each call. This program will now be described.

In pricing each call, the program evaluates up to four factors. The factors are then used to select one or more tariffs which are used to price the call. The factors include a factor SF (the service factor) relating to the type of service used in the call, a factor CustF (the customer factor) relating to the details of the customer making the call, a factor NF (the network factor) relating to the locations of the calling and called numbers in the network and a factor CF (the Calendar factor) relating to the date on which the call is made. The price of each call has one or more components. Initially, in order to price a call, a factor SCN is found. The factor SCN also relates to the type of service used in the call. The factor SCN is then used to select an algorithm from a set of algorithms which defines, for each component of the price, the factors which should be evaluated and used to select an appropriate tariff. The algorithm also defines the manner in which the price components are combined to give the total price. An algorithm is needed for each value of SCN. In the present example, the factor SCN has three values and so there are three algorithms.

The method of finding the factor SCN will now be described. This will be followed by a description of the flow charts for three algorithms and then the flow charts for evaluating each of the factors SF, CustF, NF and CF will be described. After this, there will be described the method of selecting a tariff and the method of evaluating each component of the price of a call.

In the present example, the factor SCN is found in the same way for PSTN and ISDN calls. As mentioned above, some calls have a call related network service and other calls have a non-call related network service. Using the data contained in the field 25 of the call record, the factor SCN is found as shown in Table 1 below.

TABLE 1

| SCN | Service Sub-Type |
| --- | --- |
| SCN1 | Basic call |
| SCN2 | Call related network service |
| SCN3 | Non-call network service |

By way of modification, the factor SCN may have different values for PSTN and ISDN calls.

Each of the values SCN1 to SCN3 is associated with an algorithm. After finding the factor SCN the appropriate algorithm is selected. In the present example, the algorithms are stored in the processor 16. As an alternative, they may be stored in the network database 14 and retrieved when required. The flow charts for the algorithms associated with the values SCN1 to SCN3 are shown, respectively, in FIGS. 3 to 5 and these will now be described.

Figure 3:
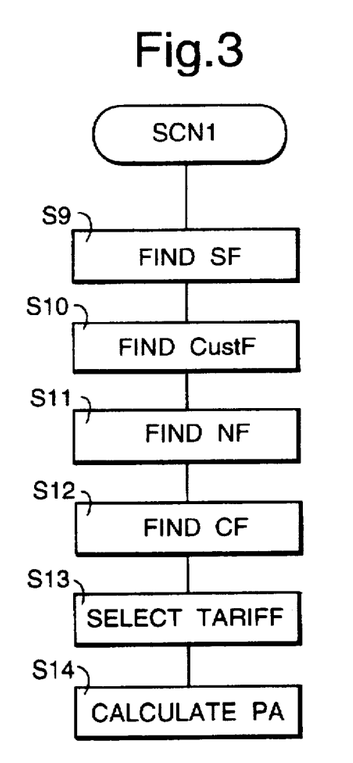

In the algorithm associated with the value SCN1, there is only one component in the price. After entering the algorithm, in a set of steps S9 to S12, values for the factors SF, CustF, NF and CF are evaluated. The method of evaluating these factors will be described in more below. Then, in a step S13, the values for the factors SF, CustF, NF and CF are used to select a tariff from the tariffs stored in database 14. In a step S14, the price PA of the call is calculated in accordance with the selected tariff and the data for the start of the call and its duration given in fields 27 and 28 of the call record. The method of calculating the price will be described in greater detail below.

Figure 4:
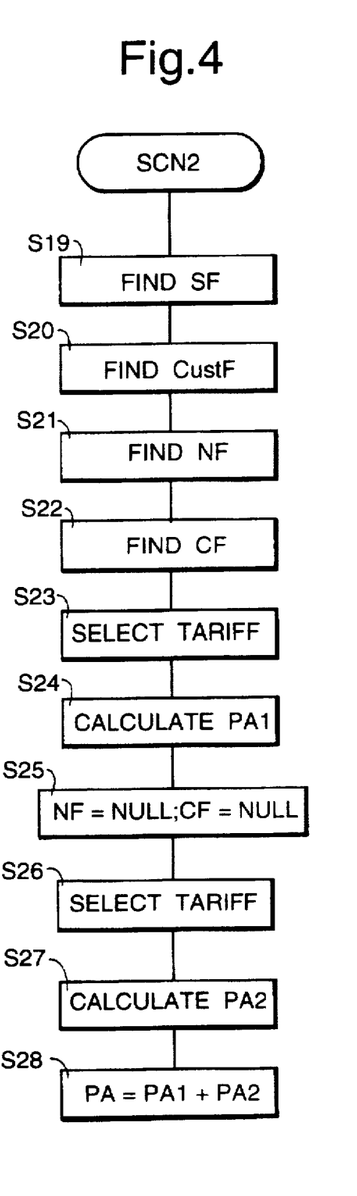

In the algorithm associated with the value SCN2, there are two components for the price of each call. Referring to FIG. 4, after entering the algorithm in a set of steps S19 to S22, the factors SF, CustF, NF and CF are evaluated. Then, in a step S23, a tariff is selected in accordance with the values of the factors SF, CustF, NF and CF for calculating the first component PA1 of the price. This component is then calculated in step S24. Then, in a step S25, the values for the factors NF and CF are both set to a value NULL. The result of setting these factors to this value is that they are not used in selecting the tariff for calculating the second component PA2 of the price. Then, in a step S26, the tariff for calculating the second component of the price is selected and the second component PA2 is calculated in a step S27. The second component is for a supplementary service. Finally, in a step S28, the price PA of the call is found by summing the components PA1 and PA2. Thus, in this algorithm, the two components are combined by summing.

Figure 5:
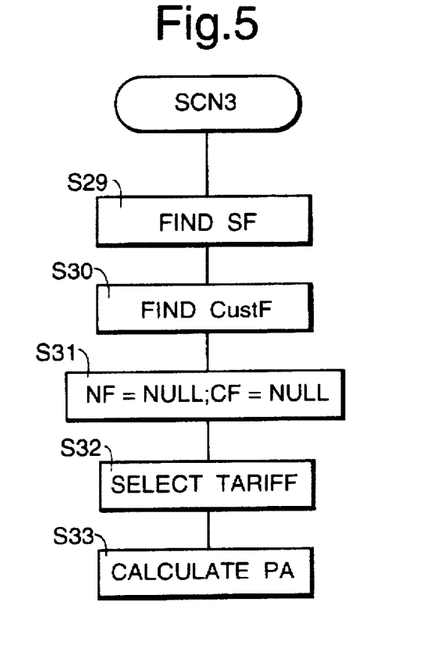

In the algorithm associated with the value SCN3, there is only one component for the price. After entering this algorithm, in a pair of steps S29, S30 the factors SF and CustF are evaluated. Then, in a step S31, the factors NF and CF are both set to a value NULL. Thus, these factors are not used in selecting the tariff. The tariff is selected in a step S32 and the price PA in calculated in a step S33. The price calculated in step S33 is for a supplementary service.

In Table 1, only three values are given for the factor SCN. Where special types of call are available on a network, for example credit card calls, there may be one or more values of the factor SCN for each special type of call. Each of these values of the factor SCN will have its own algorithm.

Figure 6:
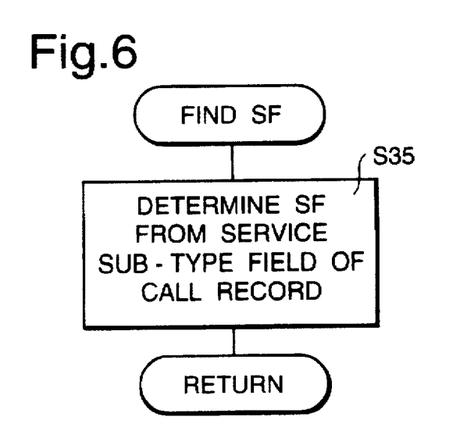
FIGS. 6 to 10 are flow charts of some of the individual steps used in the algorithms shown in FIGS. 3 to 5.

Referring now to FIG. 6, there is shown the flow chart for evaluating the factor SF. In a step S35, the factor SF is determined from the data given in the service sub-type field 25 of the call record. The values for the factor SF are shown in Table 2 below:

TABLE 2

| SF | Service Sub-Type |
| --- | --- |
| SF1 | Basic call |
| SF2 | Call related network service |
| SF3 | Non-call related network service |

By way of modification, the service type field 24 may also be used in evaluating the service factor SF so that the service factor SF has different values for PSTN and ISDN calls.

Figure 7:
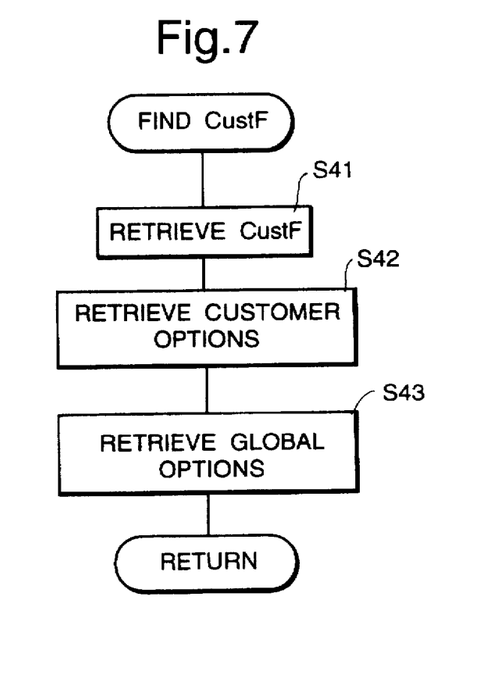

Referring now to FIG. 7, there is shown a flow chart for evaluating the factor CustF. In the network described in his example, there are two types of customer, namely residential and business. The values for the factor CustF for these two types of customer are shown in Table 3 below:

TABLE 3

| CustF | Type of Customer |
|---|---|
| CustF1 | Residential |
| CustF2 | Business (PSTN) |
| CustF3 | Business (ISDN) |

In a step S41, the details of the customer of the calling number are retrieved from the database 12 and the factor CustF is set in accordance with the values given in Table 3 above.

Each customer will normally subscribe to one or more options and the details of the options subscribed to by each customer are held in the customer database 12. Each option is assigned an option number and some examples of options and their associated options numbers are set out in Table 4 below.

TABLE 4

| Option No | Option |
|---|---|
| 1 | Basic |
| 2 | Reduced rate in peak period |
| 3 | Free calls in cheap period |
| 4 | Half rate on Sundays |
| 5 | Reduced rate 00.00–04.00 hours and 22.00–00.00 hours |
| 6 | Reduced rate on calls between London and Glasgow |

All customers will normally subscribe to the basic option. The explanation for option numbers 2, 3, 4 and 6 is clear from Table 4 above. In option number 5, calls are charged at a reduced rate between midnight and 4.00 am and again between 10.00 pm and midnight. There may also be provided a default option which is used where a customer has no subscribed options.

In a step S42, the number or numbers of the options subscribed to by the customer of the calling number are retrieved from the customer database 12 and stored together with the value of the factor CustF.

In addition to the options to which customers subscribe, there may be "global" options which are available for all customers. Examples of such options are calls between main towns and calls at a reduced rate on Sundays for a limited period. Global options are retrieved from the network database 14 in a step S43.

The options are ranked in order of precedence.

Figures 8, 9, 11:
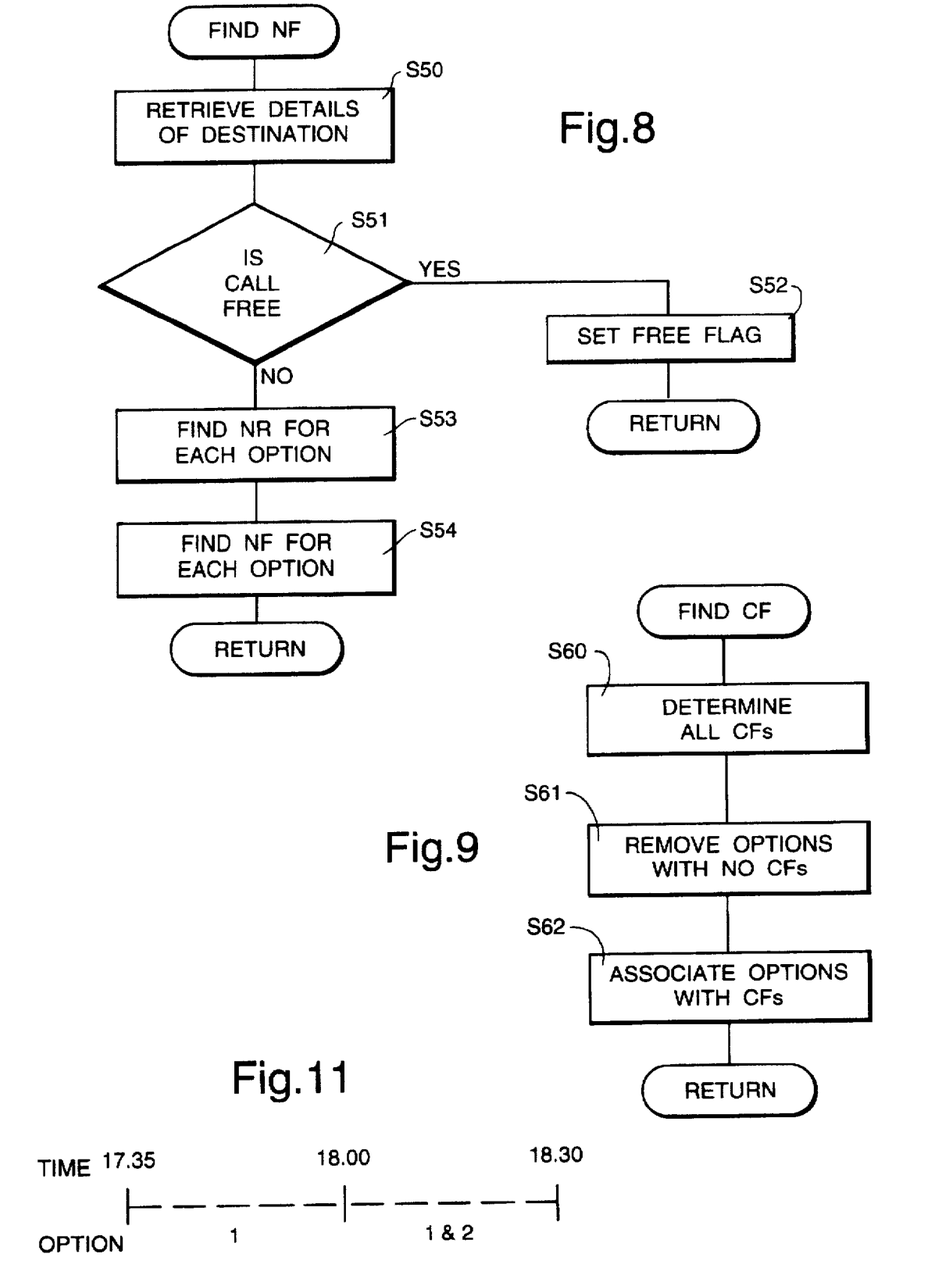
FIG. 11 is a diagram showing how a call is divided into time segments in order to price it.

Referring now to the flow chart shown in FIG. 8, there is shown the procedure for evaluating the factor NF. Initially, in a step S50, details are retrieved from the network database 14 of the called or destination number. In the network described in this example, calls to certain destination numbers are free. Then, in a step S51, a check is made to determine if the call is free. If the call is free, in a step S52, a flag is set to indicate this. The call is then priced as having no charge. If the call is not free, the program continues with step S53.

In step S53, a sub-factor NR is evaluated for each option to which the customer subscribes. The sub-factor NR relates to the route between the calling and called numbers. Exemplary values for the sub-factor NR are set out in Table below:

TABLE 5

| NR | Explanation |
|---|---|
| NR1 | Basic route |
| NR2 | Calls between main towns |
| NR3 | London to anywhere in the United Kingdom |
| NR4 | London to Glasgow |

Thus, where there is no special route available between two numbers, the sub-factor NR has a value of NR1. For calls between main towns, the sub-factor NR is set to a value of NR2. For calls between London and anywhere in the United Kingdom, the sub-factor NR is set to a value of NR3. For calls between certain main towns, the sub-factor NR has a value which is specific to the towns. In the example of Table 5, the sub-factor NR is set to a value of NR4 for calls between London and Glasgow.

The values of the sub-factor NR are ranked in order of precedence. In the present example, precedence increases with value. Where two or more values for the sub-factor NR are applicable to a particular option for a particular call, the value having the highest position in order of precedence is used. For some options there may be no applicable value of the sub-factor NR and such options are removed in step S53.

The factor NF is then evaluated in step S54 for each option. For each option, the factor NF is evaluated mainly on the basis of the distance between the calling and called numbers and the value of the sub-factor NR. The distance is calculated by retrieving the geographical location of the calling and called numbers from database 14. These locations may be the actual locations of the numbers. Alternatively, the network may be divided into small areas and the location of each number is then a central point within the area in which the number is located. From the geographical locations of the two numbers, the distance between them is calculated. Some exemplary values for the factor NF are given in Table 6 below for a network located in the United Kingdom.

TABLE 6

| NF | Explanation |
|---|---|
| NF1 | 0–50 km over any route |
| NF2 | 51–200 km over any route |
| NF3 | >200 km over a route between main towns |
| NF4 | London to Glasgow |
| NF5 | Calls to mobile 'phones |
| NF6 | UK to France |

The values NF1 to NF4 of the factor NF set out in Table 6 above are self-expplanatory. For some calls, the value of the factor NF does not depend upon distance while for calls between the UK and other countries the value is set in accordance with the country of the called number. Thus, for calls to mobile 'phones, the factor NF is set to a value of NF5 and for calls to France the factor NF is set to a value of NF6.

Some values of the factor NF depend upon the type of route between the calling and called numbers and not just the distance between the calling and called numbers. Thus, NF3 applies only to routes between main towns and NF4 applies only to calls between London and Glasgow. A value of NF which depends on the type of route is selected for a particular option if it is contained within the value of the sub-factor NR for that option. Thus, in the present example, a value of NF4 for the factor NF will only be chosen for a particular option if the sub-factor for that option has a value of NR4. Values of the factor NF which depend on the type of route are selected, where applicable, in preference to values which do not depend on the type of route. Also, values of factor NF which depend on the type of route are routed in order of precedence. In the present example, the value NF4 is higher in order of precedence than the value NF3.

Thus, it may be appreciated that the sub-factor NR is used in selecting the value of the factor NF. For each option, there will be a single value of the factor NF.

Referring now to FIG. 9 there is shown the flow chart for evaluating the factor CF. A set of exemplary values for this factor are shown in Table 7 below.

TABLE 7

| CF | Day | Date |
| --- | --- | --- |
| CF1 | Sunday | — |
| CF2 | Monday | — |
| CF3 | Tuesday | — |
| CF4 | Wednesday | — |
| CF5 | Thursday | — |
| CF6 | Friday | — |
| CF7 | Saturday | — |
| CF8 | — | 01 May 1994 |
| CF9 | — | 25 December 1994 |
| CF10 | — | 01 January 1995 |
| CF11 | — | 02 January 1995 |

The data of Table 7 is stored in the network database 14.

Some of the values are valid only where the calling number is located in a particular country. For example, 2 Jan. 1995 is a holiday in Scotland but not in other countries in the UK. The value CF11 is valid only where the calling number is located in Scotland.

In a step S60, all the values of the factor CF are found for the day of the call and the country of the calling number. For some days there will only be one value for the factor CF. For other days there will be more than one value. For example, for 1 May, 1994 which is Sunday, the factor CF will have the values CF1 and CF8. Where a call covers two or more days, it is partitioned into separate days and the values of the factor CF are found for each individual day.

Each option has a period during which it is valid. For example, a particular option may be valid only on Wednesdays. In a step S61, the period for which each option is valid is retrieved from the database 14. Any option which is not applicable on any of the days found for the factor CF is removed. In a step S62, each remaining option is associated with one or more of the values of the factor CF. For a reason which is explained below, the values of the factor CF are ranked in order of precedence. Thus, after step S62, for each component of a price, for each option there will be a set of values of the applicable ones of factors SF, CustF, NF and CF. For some options, there may be two or more applicable values of the factor CF and hence two or more sets of values for the various factors.

As mentioned above, the network database 14 has a set of tariffs for pricing calls. Each tariff gives either a complete set of rates for pricing a call in accordance with its duration for a whole day or a set of prices for supplementary services. In the case of a tariff for pricing a call in accordance with its duration, each day is divided into one or more periods with different charging rates applying to different periods. For example, a day may be divided into a peak period between 9.00 am and 1.00 pm during which calls are relatively expensive, a standard period between 8.00 am and 9.00 am and 1.00 and 6.00 pm during which calls are cheaper, and a cheap period between midnight and 8.00 am and 6.00 pm and midnight during which calls are charged at the cheapest rate. For each period, a call may cost a certain amount of money for each 10 ms. By using 10 ms as the charging period, the cost of a call will match up exactly, for all practical purposes, to its duration. Alternatively, a call may be priced at a fixed sum of money for an initial longer period, for example 60 seconds, and then priced at a certain amount for each further period of 10 ms. This would ensure a minimum charge for each call.

Each of the tariffs contained in the network database 14 has a tariff number. Each tariff number is associated with a particular set of values for the applicable factors and an option number. Examples of tariff numbers and the values for the factors and option numbers are set out below in Table 8.

TABLE 8

| Tariff No | SF | CustF | NF | CF | Option No |
| --- | --- | --- | --- | --- | --- |
| 100 | SF1 | CustF1 | NF1 | CF1 | 1 |
| 110 | SF1 | CustF1 | NF3 | CF3 | 3 |
| 123 | SF1 | CustF2 | NF2 | CF5 | 2 |
| 130 | SF2 | CustF1 | NF1 | CF2 | 1 |
| 140 | SF2 | CustF1 | NULL | NULL | 1 |

Thus, for each option for a particular component of a call, the appropriate tariff is retrieved from the network database 14. If a particular option is associated with two or more sets of values of the various factors, then the tariff is retrieved for the value of the factor CF having the highest order of precedence. For some options and corresponding set of values for the various factors, it may be found there is no applicable tariff.

Thus, for a component of a call that has an option number 2 and for which the values of the factors SF, CustF, NF and CF are, respectively, SF1, CustF2, NF2 and CF5, tariff number 123 is retrieved. By way of another example, for a component of a call for which option number 1 applies and only factors SF and CustF are to be used in selecting the tariff and these have values, respectively, of SF2 and CustF1, then tariff number 140 is retrieved. Tariff number 140 is for supplementary services.

Figure 10:
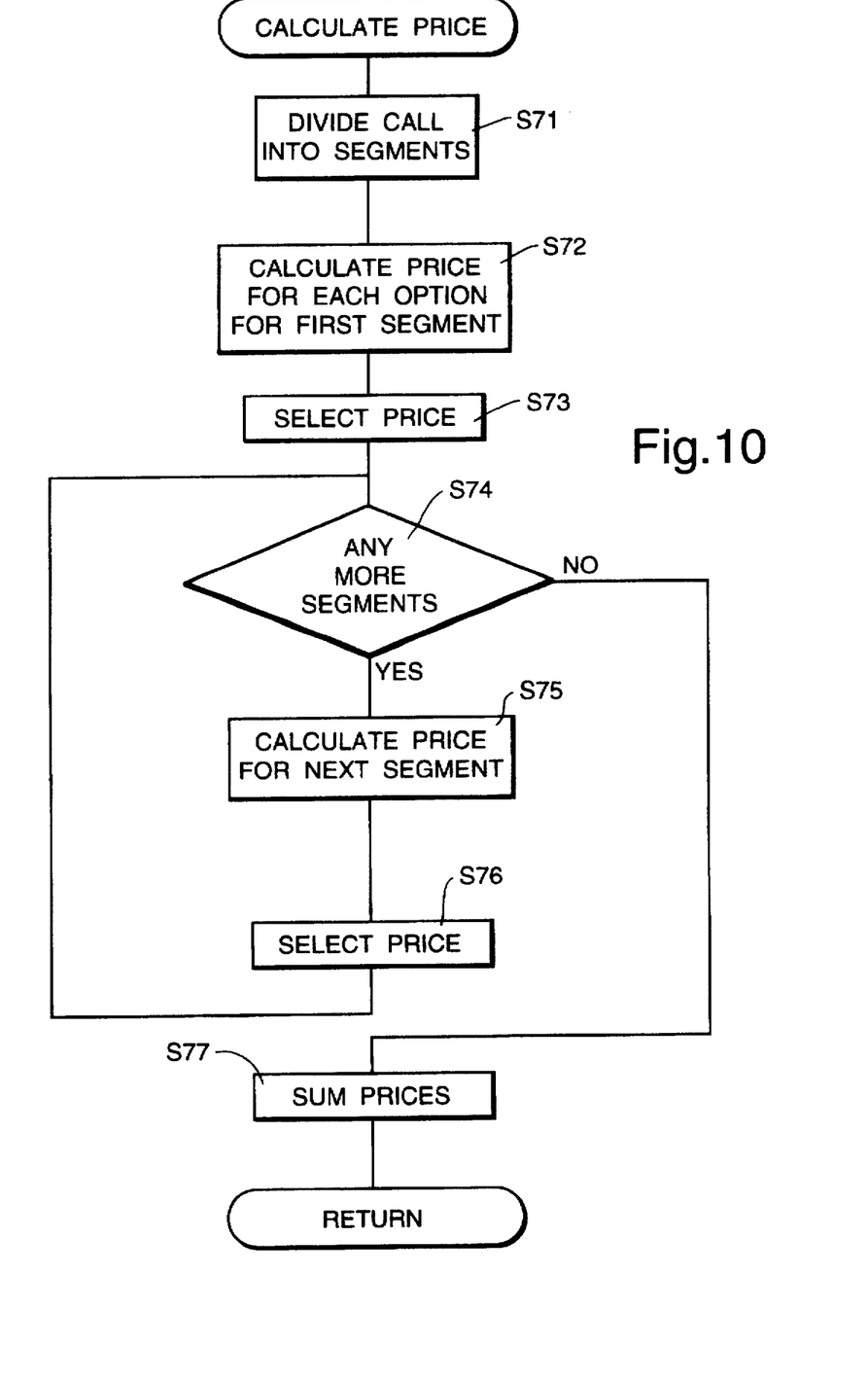

Referring now to FIG. 10, there is shown the flow chart for calculating the price of a component of a call in accordance with its duration. Thus, the flow chart shown in FIG. 10 corresponds, for example, to step S14 shown in FIG. 3 or step S24 shown in FIG. 4.

As mentioned above, each option has a period for which it is valid. Also, each tariff is divided into charging periods. In a step S71, for each day of the call, the call is divided into segments according to the charging periods and also the applicable time periods of the options. For example, as shown in FIG. 11, if a call commences at 17:35 hours and terminates at 18:30 hours, it may be divided into two time segments, namely, one commencing at 1735 and ending at 1800 and one commencing at 1800 and terminating at 1830.

In the example shown in FIG. 10, the standard charging period and option number 1 apply in the first segment and options number 1 and 2 and the charging rate for the cheap period apply in the second segment.

Then, in a step S72, the price is calculated for each option which is applicable for the first segment of the call.

If during this segment the call is simply charged at a fixed amount of money for each 10 ms, then the price of the segment is found by multiplying the fixed amount by the number of units of 10 ms which fall in the duration of the first segment. By way of another example, if a call is charged at a first fixed amount for first 10 seconds and then a second fixed for each further period of 10 ms, and the duration is longer than 10 s, then the price is found by summing the first fixed amount and the second fixed amount multiplied by the number of remaining units of 10 ms within the duration of the segment. If the duration of the first segment is less than 10 seconds, then the proportion of the 10 seconds which falls within the first segment is charged as a proportion of the first fixed amount and the remaining portion of the 10 seconds is charged according to the charging rates which apply in the next segment.

The price of a call may also be charged on a cyclic basis. For example, in a particular segment, following the end of each 60 second interval, the next 5 seconds could be free.

Where two or more options are applicable in the first segment, then it is necessary to select a price. In a step S73, the price is selected by choosing the option which has the highest order of precedence. Normally, but not necessarily, this will be the cheapest price.

Then, in a step S74, a check is made to determine if there are any more segments to be charged. If there are any further segments, in a step S75, the price is determined for each applicable option in a manner similar to that described for step S72. Then, in a step S76, if there are two or more prices for the segment, the price is selected in a manner similar to that described for step S73. The program then returns to step S74.

When there are no more segments to be priced, the program continues with a step S77 in which the prices for the various components are summed. Where a call covers two or more days, the price is calculated for each day separately and the prices for the individual days are added together.

There will now be described the procedure for calculating the price of the component of a call where the tariff gives the prices for supplementary services. Thus, the procedure corresponds to step S27 shown in FIG. 4 or step S33 shown in FIG. 5. The supplementary service is retrieved from field 26 of the call record. Then, the price for the supplementary service is found for the option which has the highest order of precedence.

In the example described above, four factor are used in selecting tariffs. By way of modification, one or more further factors may be used in selecting tariffs, the value of each further factor being specified in a field, or a bit within a field, of the call record produced by the local exchange. For example, there could be a factor relating to the type of bearer used in a call. This factor could have one value where the bearer is a bearer for speech calls and another value where the bearer is a bearer for data calls.

We claim:

1. A method of pricing a call originating in a telecommunications network comprising the steps of:

retrieving a record of the call from a point located in the telecommunications network;

providing a first database containing details of customers of the network;

providing a second database containing details of the network and a set of call tariffs;

processing data from the call record, the first database and the second database to price the call;

said data processing step comprising the steps of:

finding a service factor relating to the type of service used in the call by processing data contained in the call record;

finding a customer factor relating to the type of customer making the call;

finding a network factor relating to the location of the calling number and the called number;

finding a calendar factor relating to the day of the call;

selecting a call tariff from a set of call tariffs in accordance with the combination of the service factor, the customer factor, the network factor and the calendar factor; and pricing the call in accordance with the selected call tariff.

2. A method of pricing a call originating in a telecommunications network, the price of the call having at least one component, said method comprising the steps of:

retrieving a record of the call from a point located in the telecommunications network;

providing a first database containing details of customers of the network;

providing a second database containing details of the network and a set of call tariffs;

processing data from the call record, the first database and the second database to price the call;

said data processing step comprising the steps of:

finding a first service factor relating to the type of service used in the call;

using the first service factor to select an algorithm from a set of algorithms which defines which factors from a group of factors are to be used in determining each component of the price and the manner of combining the components to determine the price of the call, said group of factors comprising a second service factor relating to the type of service used in the call, a customer factor relating to the type of customer making the call, a network factor relating to the locations of the calling number and the called number, and a calendar factor relating to the day of the call;

for each component of the price, finding the factors defined in the algorithm;

for each component of the price, selecting a call tariff from a set of call tariffs in accordance with the factors defined in the algorithm;

for each component of the price, determining the component in accordance with the selected call tariff; and when the price of the call has more than one component, combining the components in the manner defined in the algorithm.

3. A method as claimed in claim 1 or claim 2, in which the network factor relates both to the distance between the calling number and the called number and to the route between the calling number and the called number.

4. A method as claimed in claim 1 or 2, including the step of finding the number of an option to which the customer has subscribed, the number of being used in selecting the call tariff.

5. A method as claimed in claim 1 or 2, in which one or more further factors are used in selecting the call tariff.

6. A method of pricing a call originating in a telecommunications network comprising the steps of:

retrieving a record of a call from a point located in the telecommunications network;

finding a service factor relating to the type of service used in the call by processing data contained in the call record;

finding a customer factor relating to the type of customer making the call;

finding a network factor relating to the locations of the calling number and the called number;

finding a calendar factor relating to the day of the call;

selecting a call tariff from a set of call tariffs stored in a database in accordance with the combination of the service factor, the customer factor, the network factor and the calendar factor; and pricing the call in accordance with the selected call tariff.

7. A method of pricing a call originating in a telecommunications network, the price of the call having at least one component, said method comprising the steps of:

retrieving a record of a call from a point located in the telecommunications network;

finding a first service factor relating to the type of service used in the call by processing data contained in the call record;

using the first service factor to select an algorithm from a set of algorithms which defines which factors from a group of factors are to be used in determining each component of the price of the call and the manner of combining the components to determine the price of the call, said group of factors comprising a second service factor relating to the type of service used in the call, a customer factor relating to the type of customer making the call, a network factor relating to the locations of the calling and called numbers, and a calendar factor relates to the day of the call;

for each component of the price finding the factors defined in the algorithm;

for each component of the price, selecting a call tariff from a set of call tariffs stored in a database in accordance with the factors defined in the algorithm;

for each component of the price, determining the component in accordance with the selected algorithm; and where the price of the call has more than one component, combining the components in the manner defined in the algorithm.

8. A system for pricing a telecommunications call originating in a telecommunications network, said system comprising:

a telecommunications point located in the network for providing a call record for each call;

a first database containing details of the customers of the network;

a second database containing details of the network and a set of call tariffs;

means for processing data from a call record, the first database and the second database to price a call; and means for providing a communication link between the processing means and each of the telecommunications point, the first database and the second database;

said processing means comprising:

means for finding a service factor relating to the type of service used in a call by processing data contained in the call record for the call;

means for finding a customer factor relating to the type of customer making a call;

means for finding a network factor relating to the locations of the calling number and the called number for a call;

means for finding a calendar factor relating to the day of a call;

means for selecting a call tariff from a set of call tariffs in accordance with the combination of the service factor, the customer factor, the network factor and the calendar factor found for a call; and means for pricing a call in accordance with a selected call tariff.

9. A system for pricing a telecommunications call originating in a telecommunications network, the price of the call having at least one component, said system comprising:

a telecommunications point located in the network for providing a call record for each call;

a first database containing details of the customers of the network;

a second database containing details of the network and a set of call tariffs;

means for processing data from a call record, the first database and the second database to price a call; and means for providing a communication link between the processing means and each of the telecommunications point, the first database and the second database;

said processing means comprising:

means for finding a first service factor relating to the type of service used in a call;

means for using the first service factor to select an algorithm from a set of algorithms which defines which factors from a group of factors are to be used in determining each component of a price of a call and the manner of combining the components to determine the price of the call, said group of factors comprising a second service factor relating to the type of service used in the call, a customer factor relating to the type of customer making a call, a network factor relating to the locations of the calling number and the called number for a call, and a calendar factor relating to the day of a call;

means for finding the factors defined in the algorithm for each component of the price of a call;

means for selecting a call tariff for each component of the price of a call from a set of call tariffs in accordance with the factors defined in the algorithm;

means for determining each component of the price of a call in accordance with the selected call tariff; and means for combining the components in the manner defined in the algorithm.

10. A system as claimed in claim 8 or claim 9, in which the network factor relates to the distance between the calling number and the called number, and to the route between the calling number and the called number.

11. A system as claimed in claim 8 or 9, including means for finding the number of an option to which the customer has subscribed, the means for selecting a call tariff using the number of the option in selecting a call tariff.

12. A system as claimed in claim 8 or 9, in which the telecommunications point, the first database and the second database are all located remotely from each other.

13. A system as claimed in claim 8 or 9, including means for storing the details of priced calls.

14. A system as claimed in claim 8 or 9, in which the telecommunications point is a telecommunications switch.

15. A system for pricing a telecommunications call originating in a telecommunications network, said system comprising:

a telecommunications point located in the network for providing a call record for each call;

means for finding a service factor relating to the type of service used in a call by processing data contained in the call record for the call;

means for finding a customer factor relating to the type of customer making a call;

means for finding a network factor relating to the locations of the calling number and the called number for a call;

means for finding a calendar factor relating to the day of a call;

means for selecting a call tariff from a set of call tariffs in accordance with the combination of the service factor, the customer factor, the network factor and the calendar factor found for a call; and means for pricing a call in accordance with a selected call tariff.

16. A system for pricing a telecommunications call originating in a telecommunications network, said system comprising:

a telecommunications point located in the network for providing a call record for each call;

means for finding a first service factor relating to the type of service used in a call;

means for using the first service factor to select an algorithm from a set of algorithms which defines which factors from a group of factors are to be used in determining each component of a price of a call and the manner of combining the components to determine the price of the call, said group of factors comprising a second service factor relating to the type of service used in the call, a customer factor relating to the type of customer making a call, a network factor relating to the locations of the calling number and the called number for a call, and a calendar factor relating to the day of a call;

means for finding the factors defined in the algorithm for each component of the price of a call;

means for selecting a call tariff for each component of the price of a call from a set of call tariffs in accordance with the factors defined in the algorithm;

means for determining each component of the price of a call in accordance with the selected call tariff; and means for combining the components in the manner defined in the algorithm.

17. A system for pricing a telecommunications call originating in a telecommunications network, said system comprising:

a telecommunications point located in the network for providing a call record for each call;

a first database containing details of the customers of the network;

a second database containing details of the network and a set of call tariffs;

a computer arranged to process data from a call record, the first database and the second database; and means for providing a communications link between the computer and each of the telecommunications point, the first database and the second database;

said computer being controlled by a program as to perform the operations of:

finding a service factor relating to the type of service used in the call by processing data contained in the call record;

finding a customer factor relating to the type of customer making the call;

finding a network factor relating to the location of the calling number and the called number;

finding a calendar factor relating to the day of a call;

selecting a call tariff from a set of call tariffs in accordance with the combination of the service factor, the customer factor, the network factor and the calendar factor; and pricing the call in accordance with the selected call tariff.

18. A system for pricing a telecommunications call originating in a telecommunications network, the price of the call having at least one component, said system comprising:

a telecommunications point located in the network for providing a call record for each call;

a first database containing details of the customers of the network;

a second database containing details of the network and a set of call tariffs;

a computer arranged to process data from a call record, the first database and the second database; and means for providing a communications link between the computer and each of the telecommunications point, the first database and the second database;

said computer being controlled by a program to perform the operations of:

finding a first service factor relating to the type of service used in the call;

using the first service factor to select an algorithm from a set of algorithms which defines which factors from a group of factors are to be used in determining each component of the price and the manner of combining the components to determine the price of the call, said group of factors comprising a second service factor relating to the type of service used in the call, a customer factor relating to the type of customer making the call, a network factor relating to the locations of the calling number and the called number, and a calendar factor relating to the day of the call;

for each component of the price, finding the factors defined in the algorithm;

for each component of the price, selecting a call tariff from a set of call tariffs in accordance with the factors defined in the algorithm;

for each component of the price, determining the component in accordance with the selected call tariff; and when the price of the call has more than one component, combining the components in the manner defined in the algorithm.

* * * * *